(12) United States Patent
Frizzell

(10) Patent No.: US 9,353,892 B2
(45) Date of Patent: May 31, 2016

(54) CABLE RETAINING APPARATUS

(71) Applicant: Lee Frizzell, Cramlington (GB)

(72) Inventor: Lee Frizzell, Cramlington (GB)

(73) Assignee: CMP Products Limited, Cramlington, Northumberland (GB)

( * ) Notice: Subject to any disclaimer, the term of this patent is extended or adjusted under 35 U.S.C. 154(b) by 11 days.

(21) Appl. No.: 14/342,920

(22) PCT Filed: Sep. 17, 2012

(86) PCT No.: PCT/EP2012/068274
§ 371 (c)(1),
(2) Date: Mar. 5, 2014

(87) PCT Pub. No.: WO2013/038019
PCT Pub. Date: Mar. 21, 2013

(65) Prior Publication Data
US 2014/0325799 A1    Nov. 6, 2014

(30) Foreign Application Priority Data

Sep. 16, 2011 (EP) .................................... 11181645

(51) Int. Cl.
*F16L 33/02* (2006.01)
*F16L 33/08* (2006.01)
(Continued)

(52) U.S. Cl.
CPC *F16L 3/137* (2013.01); *H02G 3/32* (2013.01); *H02G 7/10* (2013.01); *Y10T 24/14* (2015.01)

(58) Field of Classification Search
CPC . F16L 3/137; Y10T 24/1441; Y10T 24/1427; Y10T 24/1412

USPC ......... 24/68 D, 68 B, 68 CD, 269, 279, 16 R; 248/68.1

See application file for complete search history.

(56) References Cited

U.S. PATENT DOCUMENTS 669,506 A * 3/1901 Clark .......................... 242/388.2
2,710,998 A * 6/1955 Meighan et al. .............. 24/68 B
(Continued)

FOREIGN PATENT DOCUMENTS

EP        0 235 617 A1    9/1987
FR        595 684 A       10/1925
(Continued)

OTHER PUBLICATIONS

International Search Report and Written Opinion under date of Jan. 14, 2013 in connection with PCT/EP2012/068274.

*Primary Examiner* — Victor Batson
*Assistant Examiner* — Jason W San
(74) *Attorney, Agent, or Firm* — Quarles & Brady LLP

(57) ABSTRACT

A cable retaining apparatus is disclosed. The apparatus includes a band that is wrapped around a group of cables and a clamping portion that holds the ends of the band. The clamping portion has a body portion that is fixed to one end of the band. The body portion also has an axle mounted to it, the axle having a slot cut into it to receive the other end of the band. The end of the axle has a rotatable head for engagement by a tool such as a spanner so that rotation of the head causes the axle to rotate. The body portion also has an aperture that is aligned with an aperture in the axle so that a pin can extend through the apertures to prevent rotation of the axle. In use the band is placed round the cables and its end inserted into the slot. The axle is then rotated and band winds around the axle until it tightens around the cable. The pin is then inserted into the apertures to prevent the band unwinding.

7 Claims, 6 Drawing Sheets

(51) Int. Cl.
*F16L 3/137* (2006.01)
*H02G 3/32* (2006.01)
*H02G 7/10* (2006.01)

(56) References Cited

U.S. PATENT DOCUMENTS

| | | | | |
|---|---|---|---|---|
| 4,546,524 | A * | 10/1985 | Kreft | 24/274 R |
| 4,700,434 | A * | 10/1987 | Fambrough | 242/388.2 |
| 4,971,272 | A * | 11/1990 | Gudridge et al. | 248/74.5 |
| 5,257,439 | A * | 11/1993 | LeBlanc | 24/269 |
| 5,504,978 | A * | 4/1996 | Meyer, III | 24/274 R |
| 5,661,876 | A * | 9/1997 | Goldenberg | 24/19 |
| 5,671,506 | A * | 9/1997 | Eliasson | 24/19 |
| 5,729,873 | A * | 3/1998 | Miley | 24/274 R |
| 5,761,774 | A * | 6/1998 | Champi | 24/274 R |
| 6,000,104 | A * | 12/1999 | Mann | 24/274 R |
| 6,431,487 | B1 * | 8/2002 | Wall | 242/388.2 |
| D483,442 | S * | 12/2003 | Leccacorvi | D23/265 |
| 7,055,225 | B1 * | 6/2006 | Brant et al. | 24/269 |
| 7,467,442 | B2 * | 12/2008 | Chen | 24/281 |
| 8,056,192 | B1 * | 11/2011 | Posner | 24/272 |
| 2006/0107498 | A1 * | 5/2006 | Ignaczak et al. | 24/279 |
| 2006/0191113 | A1 * | 8/2006 | Chin | 24/279 |
| 2009/0272855 | A1 * | 11/2009 | Oram | 248/67.5 |
| 2013/0047409 | A1 * | 2/2013 | Booth | 29/525.01 |
| 2013/0068900 | A1 * | 3/2013 | Heath | 248/70 |
| 2014/0196257 | A1 * | 7/2014 | Entwistle | 24/16 R |
| 2014/0305617 | A1 * | 10/2014 | Sampson | 165/121 |

FOREIGN PATENT DOCUMENTS

| | | |
|---|---|---|
| FR | 2 461 382 A1 | 1/1981 |
| GB | 2 477 170 A | 7/2011 |

* cited by examiner

CABLE RETAINING APPARATUS

CROSS-REFERENCE TO RELATED APPLICATIONS

This application represents the national stage entry of PCT International Application No PCT/EP2012/068274 filed Sep. 17, 2012, which claims priority to European Patent Application 11181645.0 filed Sep. 16, 2011, the disclosures of which are hereby incorporated by reference in their entirety for all purposes.

The present invention relates to a cable retaining apparatus and relates particularly, but not exclusively, to a cleat for holding three high voltage sheathed electrical cables used in three phased power distribution.

In three phased power transmission cables, if a short circuit occurs between any of the cables, the electromechanical force set up between the cables causes a sudden, large movement of the cable in opposite directions. At the high voltages of power distribution cables, this is extremely dangerous, with potential to cause injury to personnel and damage to the cables and surrounding equipment.

As a result, it is known to use cable cleats in order to hold the three cables together. This is particularly the case where the cables are attached to a wall and regularly spaced strong cleats are used to hold the cables together in the event of a short circuit.

One example of such a cable cleat uses a band of metal that is wound around a split pin to vary the size of the aperture created by the metal band. At the ring end of the split pin, a handle is provided, typically made from a rigid wire, to rotate the split pin. The handle is then clipped into engagement with part of the cleat to retain the band in a locked position. Such a cleat has the advantage that it can operate over a wide variety of different diameters of cable. However, the cleat is very difficult to install and the process of winding the band onto the split pin and locking the cable is difficult and often result in hand injuries.

Preferred embodiments of the present invention seek to overcome the above disadvantages of the prior art.

According to the present invention, there is provided a cable retaining apparatus for retaining at least one cable, the apparatus comprising a band adapted to be wrapped around at least one cable and clamping means for holding a first end of said band relative to a second end of said band, said clamping means comprising:—
  a body portion fixedly mounted to said first end of said band, said body portion having axle mounting means for mounting an axle thereto, said axle mounting means containing at least one first aperture extending therethrough for receiving at least one retaining pin;
  an axle rotatably mounted to said axle mounting means of said body portion, said axle having
    band engaging means for removably connecting said axle to said second end of said band,
    axle rotation means for allowing the axle to be rotated relative to said body portion and
    at least one pin engaging surface adapted to be aligned with said first aperture such that when said retaining pin extends through said first aperture and engages said pin engaging surface said axle is prevented from rotating relative to said axle mounting means.

By providing a rotatable axle with perpendicular apertures that align with apertures in an axle mounting means provides the advantage that the cable cleat of the present invention is easily and safely installed. The split pin devices of the prior art have the disadvantage that they are difficult to use, in particular because the metal of the band must be quite strong and is therefore quite stiff and where small cables are used, the pin must be rotated many times in order to reduce the length of the band so as to provide a gripping force to the cables. Furthermore, the final tightening and clipping of the handle is difficult, leading to hand injuries.

In the device of the present invention, the use of a pin as the locking device with associated apertures provides the advantage that the locking mechanism is much easier and safer to operate than those of the prior art, thereby reducing the likelihood of hand injuries. Furthermore providing an axle rotating means such as a hexagonal head that a ratchet socket spanner can engage makes the tightening of the band significantly easier.

In a preferred embodiment at least one pin engaging surface comprises at least one second aperture extending through said axle perpendicular to said axle, said second aperture alignable with said first aperture to receive the or each retaining pin therethrough.

In another preferred embodiment at least one pin engaging surface comprises an external surface of said axle.

In a preferred embodiment the body portion comprises at least one base portion attached to said band and side portions extending from said base portion, said side portions having said axle mounting means extending therethrough.

In another preferred embodiment the axle mounting means comprises an aperture in each of said side portions and a collar mounted to at least one of said side portions, first aperture extending through said collar.

Using a collar to provide the apertures into which the locking pin is located provides the advantage that the collar is easily manufactured and added to the cleat and assists in the mounting of the axle. It also allows the pin to be partially inserted, that is through the aperture in the collar and then by applying a light pressure to the pin and rotating the axle, the second aperture in the axle will become aligned with the first aperture in the collar then allowing the pin to enter the second aperture when they become aligned. This makes the process of locking the cleat into position significantly easier than in the prior art.

In a further preferred embodiment the band engaging means comprises a third aperture extending at least partially through said axle.

The third aperture may comprise a slot adapted to receive an end portion of said band, wherein rotation said axle causes said band to become fixedly attached to said axle.

The use of a slot in the axle, in particular where the axle is rotated with a ratchet socket spanner or similar tool, provides the advantage that the first stages of the locking of the band are straightforward. The distal end of the band is simply inserted into the slot and the axle rotated. The band only needs to be held into position until slightly beyond a half turn has been completed when the band then applies a gripping force to itself.

In a referred embodiment the rotation means comprises tool engaging means for engaging a tool adapted to apply a rotational force to said axle.

By using tool engaging means to apply a rotational force to the rotation means of the apparatus provides the advantage that a simple tool such as a ratchet socket spanner can be used to tighten the band of this cable cleat. This reduces the weight and cost of production of the cleat by removing one of the components and reduces the likelihood of hand injuries.

A preferred embodiment of the present invention will now be described by way of example only, and not in any limitative sense, with reference to the accompanying drawings in which.

Figure 1:
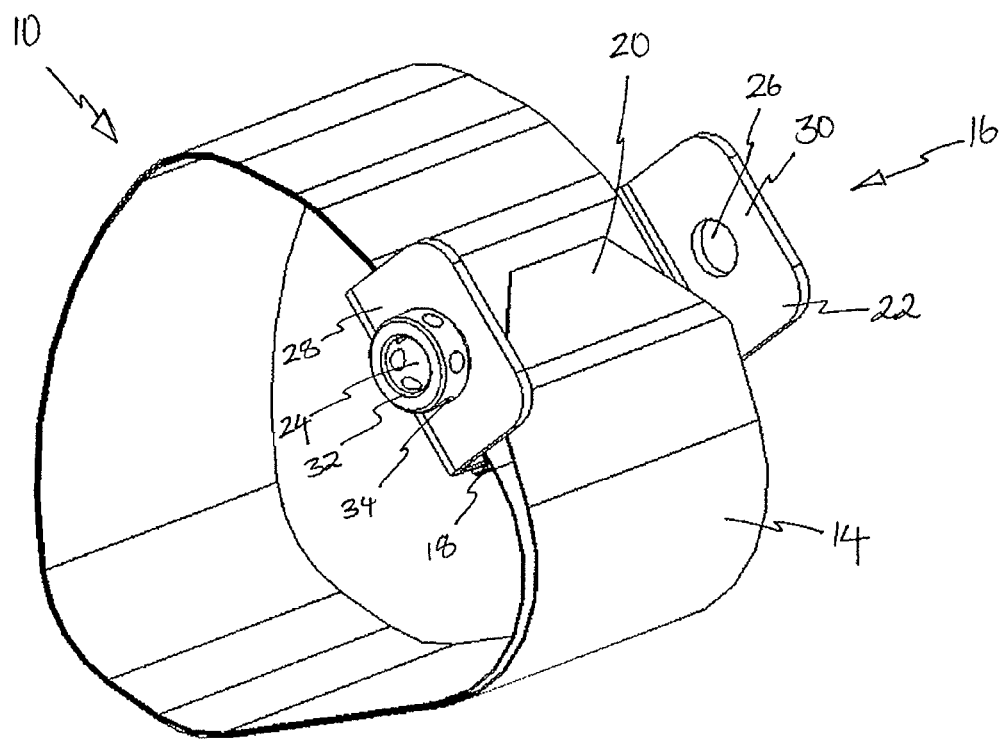
FIG. 1 is a perspective view part of the device of the present invention.

Referring to the figures, a cable retaining apparatus or cable cleat 10 for retaining at least one, and most typically three cables 12, has a band 14, typically of a metal material that is used to extend around the cables 12. The cleat has clamping means 16 that is used to hold a first end 18 of band 14 relative to a second end 20 of the band. The clamping means 16 as a U-shaped body portion 22 to which the first end 18 of band 14 is attached by welding. The body portion has axle mounting means in the form of apertures 24 and 26 that are formed in the upstanding arms 28 and 30 of U-shaped body portion 22. At least one of the apertures 24 and 26, in the embodiment shown as aperture 24, has a collar 32 that has at least one aperture, preferably a pair of apertures and ideally a plurality of pairs of first apertures 34 extending therethrough. These apertures 34 are sized to receive a clip pin 36, see FIG. 6.

Figure 2:
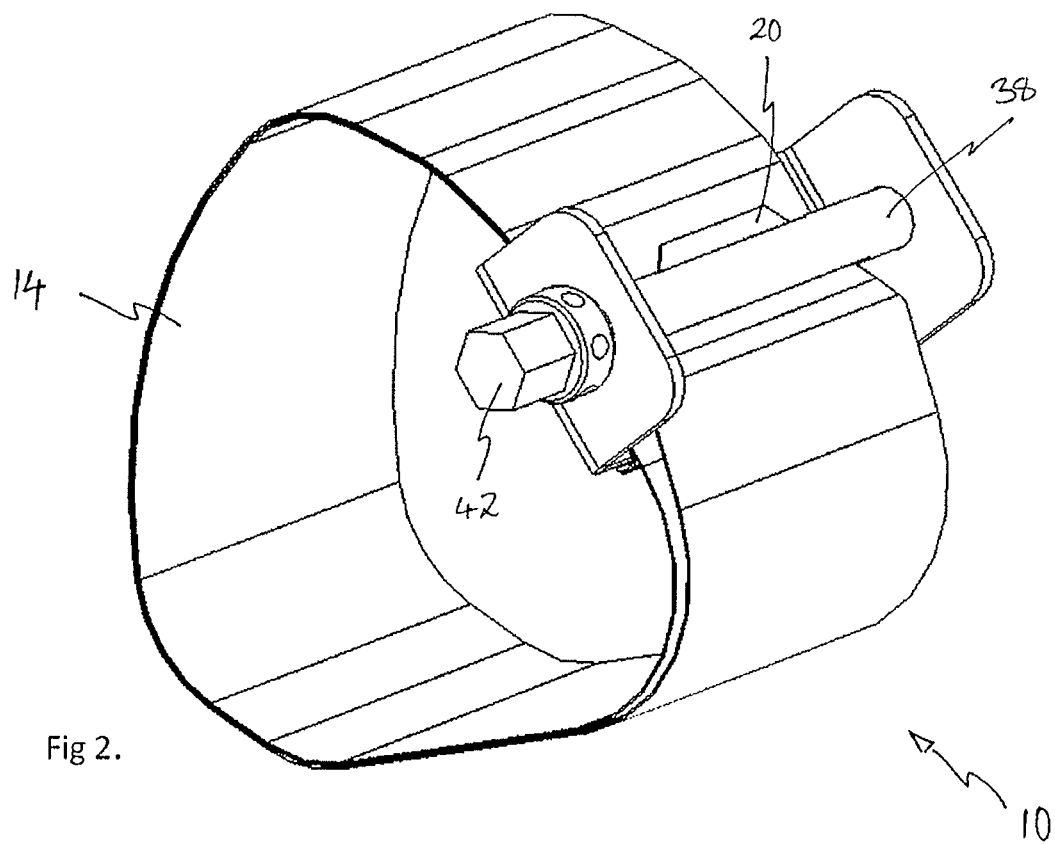
FIG. 2 is a perspective view of the device of FIG. 1 with the addition of the axle.
Figure 3:
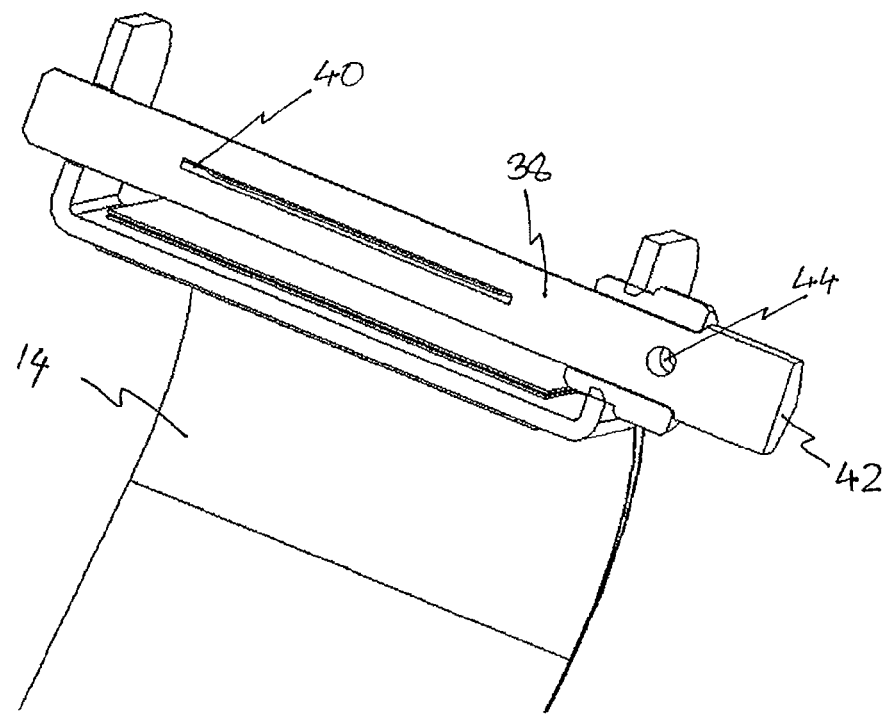
FIG. 3 is a perspective sectional view of part of the device of FIG. 2.
Figure 4:
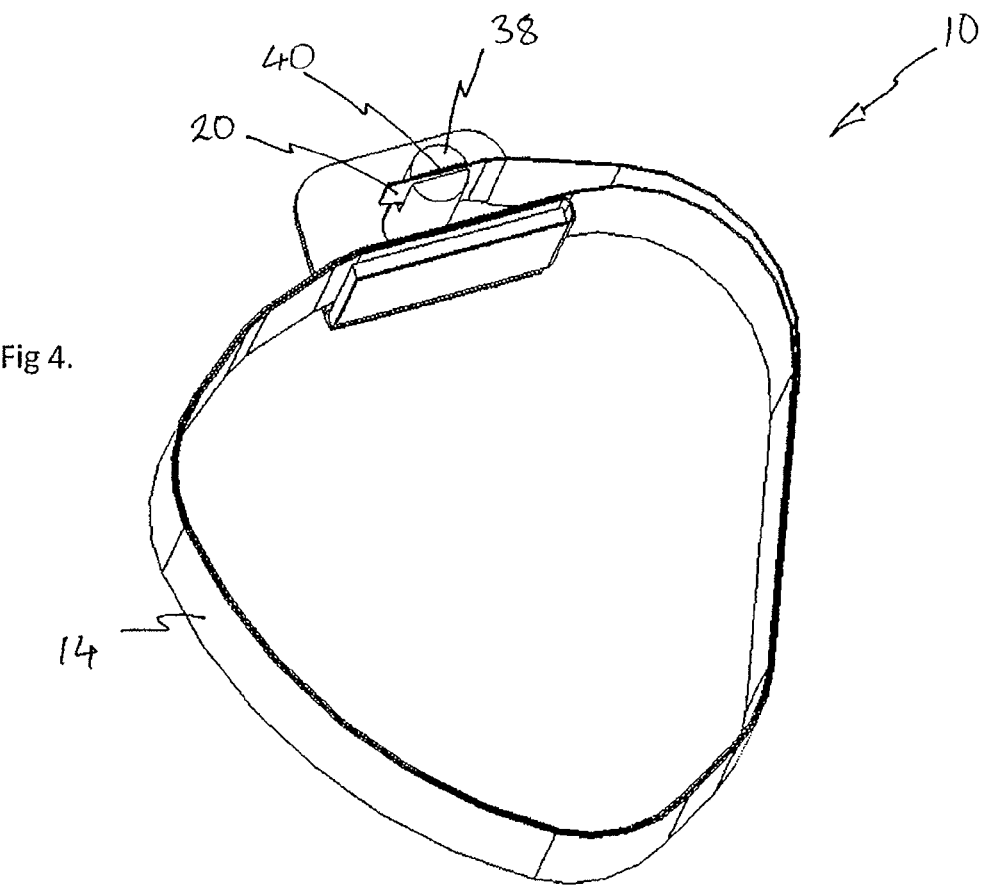
FIG. 4 is a partial sectional view, cut perpendicular to that shown in FIG. 3, of the device shown in FIG. 2.

Rotatably mounted in apertures 24 and 26 is an axle 38. The axle 38 has band engaging means, in the form of slotted aperture 40, into which the second tapering end 20 of band 14 can be inserted, as shown in FIGS. 2 and 4. The axle also has axle rotation means in the form of a hexagonal head 42 that co-operates with a tool, such as a ratchet socket spanner (not shown), to apply a rotational force to the axle. The axle 38 contains a second aperture 44 that works in co-operation with the first apertures 34 to receive pin 36.

Figure 5:
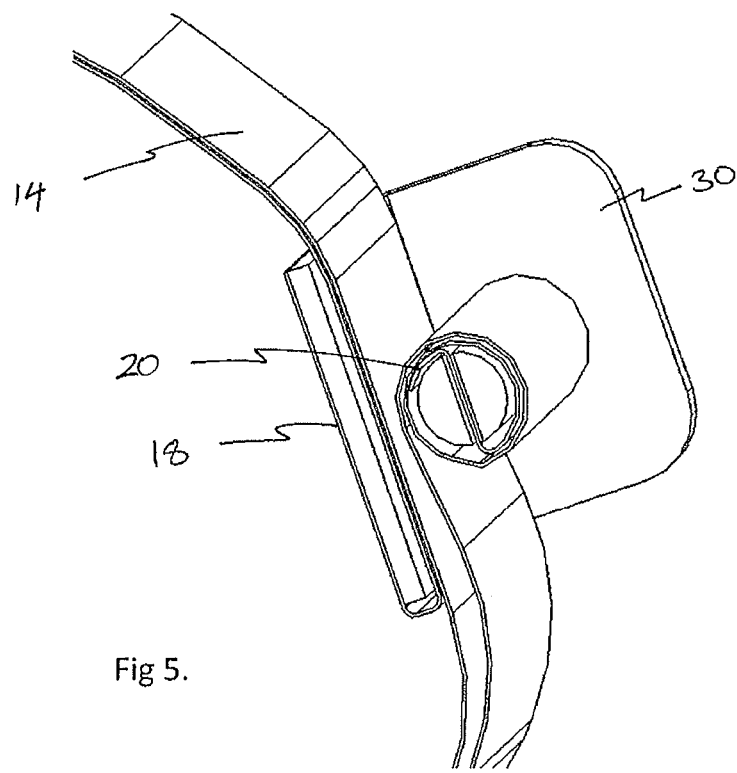
FIG. 5 is a close-up view similar to that in FIG. 4 showing the device in use.

Use of the cable cleat 10 will now be described. The band 14 of cleat 10 is wrapped around the cables 12 that it is to hold. The first end 18 of band 14 is attached to the base of U-shaped body portion 22. As seen in FIG. 5, the band 14 initially points in a clockwise direction (as viewed in this figure) before it is bent around the base of U-shaped body portion 22 and then extends to cover over the upper surface of the base of U-shaped body portion 22 in an anti-clockwise direction. As a result, the first end 18 of band 14 is formed in a U-shape which helps maintain its fixed engagement with the body portion 22. The band 14 wraps around the cables 12 and in the examples shown in the figures, the band extends twice around the cables 12. Looking in detail at FIG. 5, the portions of the band 14 shown in the uppermost part of FIG. 5 show two layers of the band in very close proximity. In the lower portion of FIG. 5 the two layers of band 14 are slightly separated. The first layer of band 14 runs around the three cables and then the band is fed through the clamping means 16 between the base of U-shaped body portion 22 and axle 38 before wrapping around the cables again and the second end 20 of band 14 being brought into engagement with axle 38.

Figure 6:
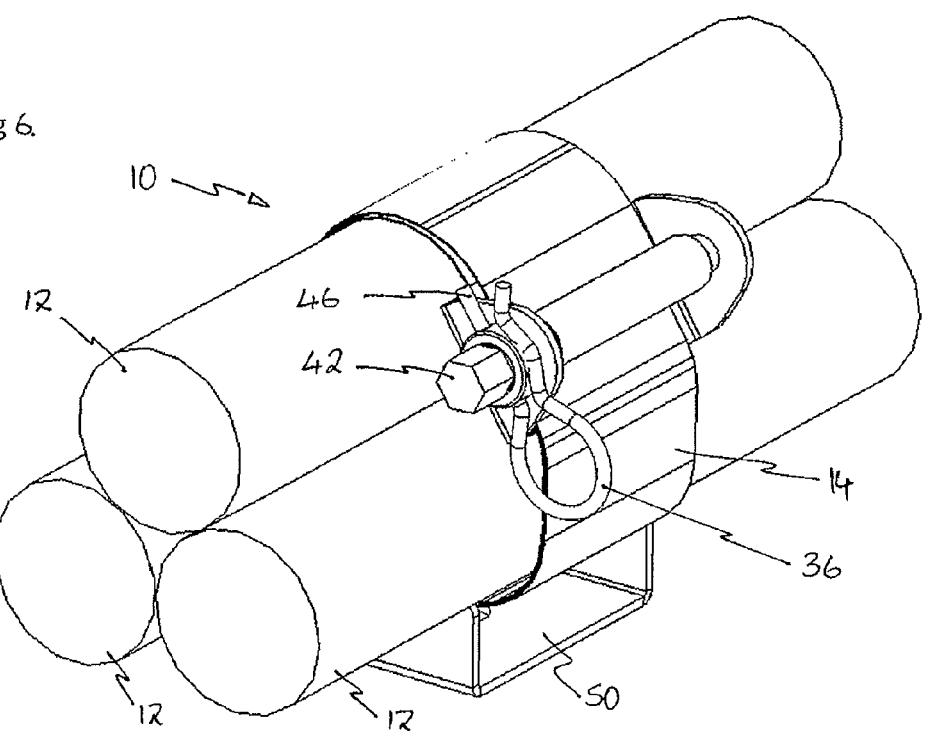
FIG. 6 is a perspective view of an alternative embodiment of a device of the present invention in use with cables.
Figure 7:
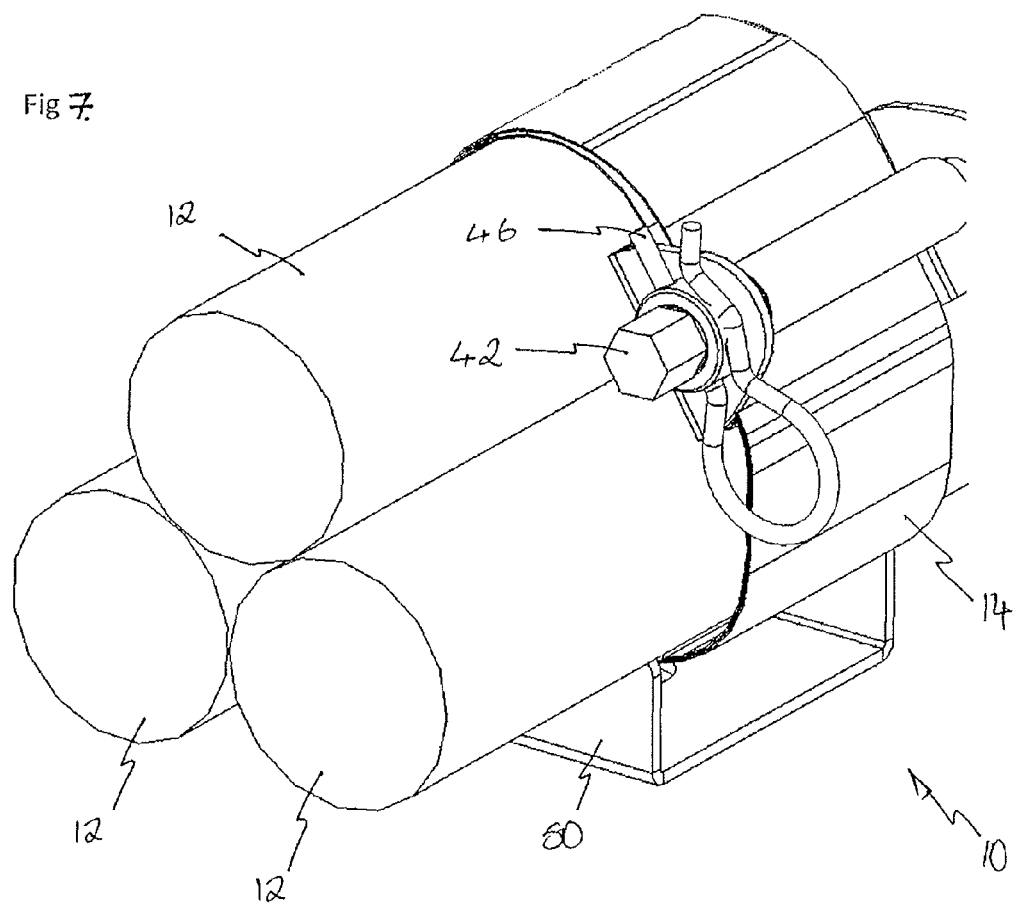
FIG. 7 is a close up perspective view of the device of FIG. 6.

As seen in FIGS. 2 and 4, the second end 20 of band 14 is fed through slot 40 in axle 38. A tool, such as a ratchet socket spanner, is engaged with hexagonal head 42 and a clockwise rotational force is applied to the head 42 and axle 38. This causes the band 14 to wrap around axle 38 as seen in FIGS. 5, 6 and 7. This in turn pulls the band 14 into engagement with cables 12 as shown in FIGS. 6 and 7.

Figure 8:
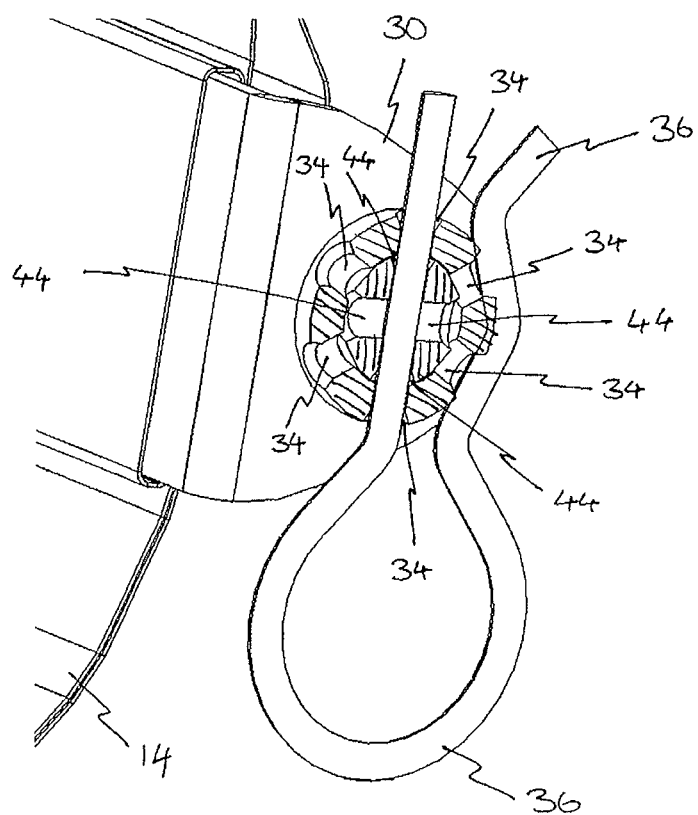
FIG. 8 is a sectional view of a portion of the device of FIG. 6 cut through the winding and locking parts.

When sufficient gripping force is applied by band 14 to cables 12, the clip pin 36 is introduced into the first aperture 34. If the first aperture 34 and second aperture 44 are not aligned with each other, only the end portion 46 of pin 36 will extend through first aperture 34. The hexagonal head 42 of axle 38 is rotated a little further whilst a gentle pressure is applied onto pin 36 until the first and second apertures 34 and 44 are aligned. Then the end portion 46 of pin 36 will extend through the first aperture 34 of collar 32, through the second aperture 44 and further through the opposing first aperture 34 on the other side of collar 32. In the sectional view in FIG. 8, it can be seen that the axle 38 is provided with two apertures 44 that receive the pin 36. It should be noted that the axle may be provided with only a single pin receiving aperture 44 in order to strengthen the axle or alternatively could be provided with more such apertures. Because pin 36 is a spring clip pin, the pin will remain in place unless sufficient force is applied to the pin to pull it out.

As slight variation to this method, the axle 38 can be introduced through the apertures 24 and 26 of upstanding arms 28 and 30 after the band 14 has been wrapped around the cables 12. If larger cables are used, the band 14 may not be able to extend around the cables more than once, and in this instance a single layer of band 14 provides the clamping force. Similarly, if the band is too long, further layers of the band can be used by wrapping the band around the cables more than twice. Alternatively, the band can be cut to a suitable length.

It will be appreciated by persons skilled in the art that the above embodiments have been described by way of example only and not in any limitative sense, and that the various alterations and modifications are possible without departure from the scope of the invention as defined by the appended claims.

Figure 9:
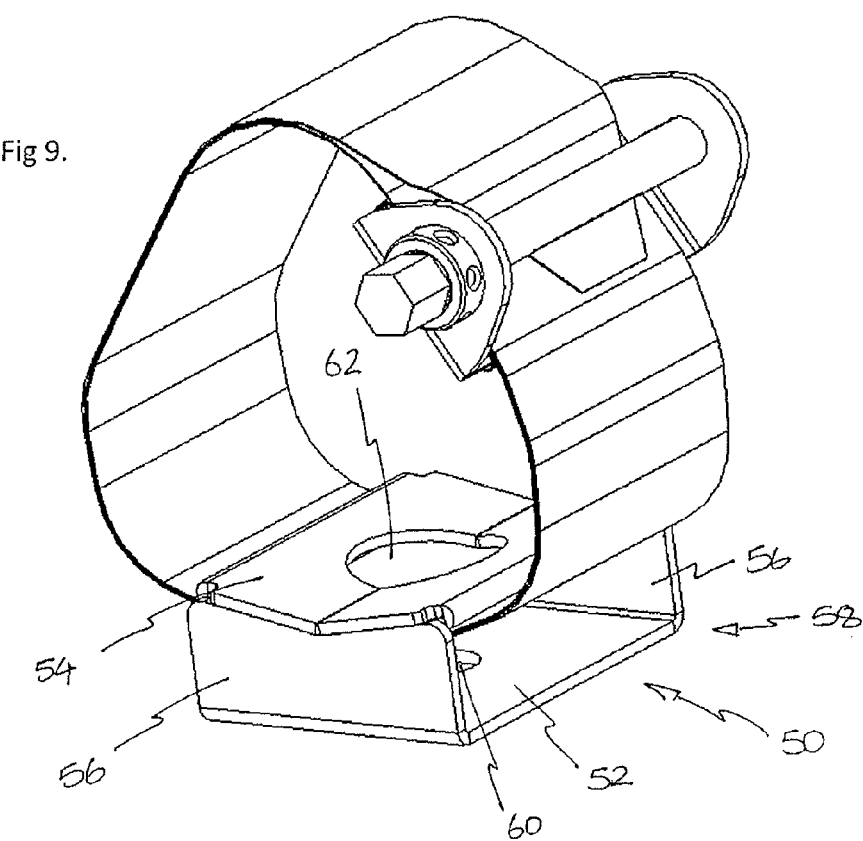
FIG. 9 is a perspective view of the device of FIG. 6 without the cables.
Figure 10:
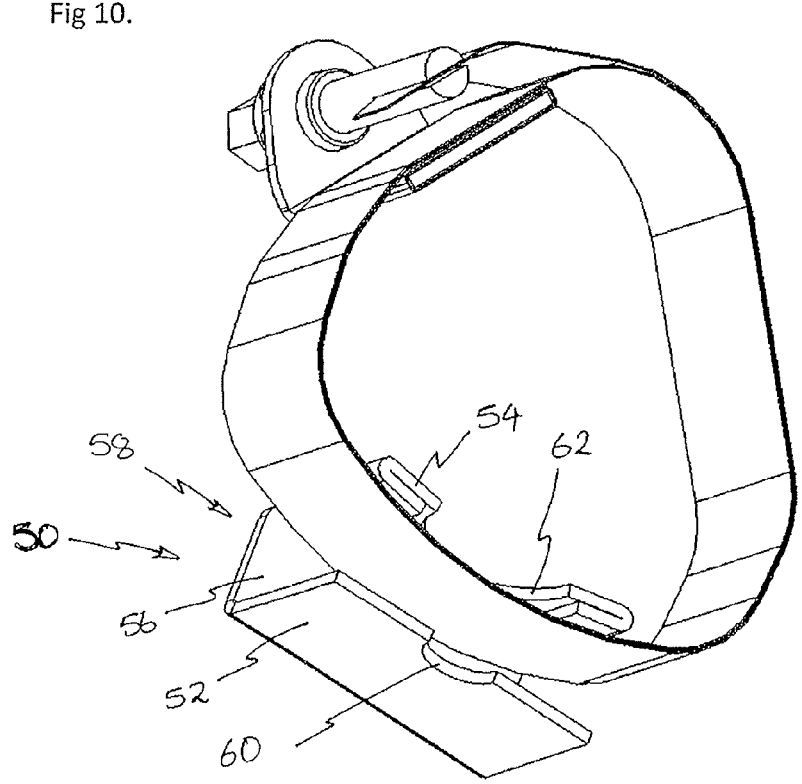
FIG. 10 is a sectional view of the device of FIG. 9.

For example, an alternative embodiment of the present invention is shown in FIGS. 9 and 10 in which an additional feature of a mounting bracket 50 is shown. The bracket 50 has a first wall 52 for engaging a surface the bracket is to be mounted to and a second wall 54 for engaging the band 14 and, in use, the cables 12. The first and second walls 52 and 54 are connected by a pair of side walls 56 and together form an access 58 through which the band 14 can pass. The first wall 52 has a fixing aperture 60 that receives a fixing device (not shown) such as a screw or bolt, that fixes the bracket to the surface. A second aperture 62, in second wall 54, allows access to the fixing device. When the bracket is fixed in place the cables 12 are placed against the second wall 54 and the band 14 wrapped around them and through access 58 until the end 20 can extend through aperture 40. The band is then tightened around the cables 12 as previously described.

Figure 11:
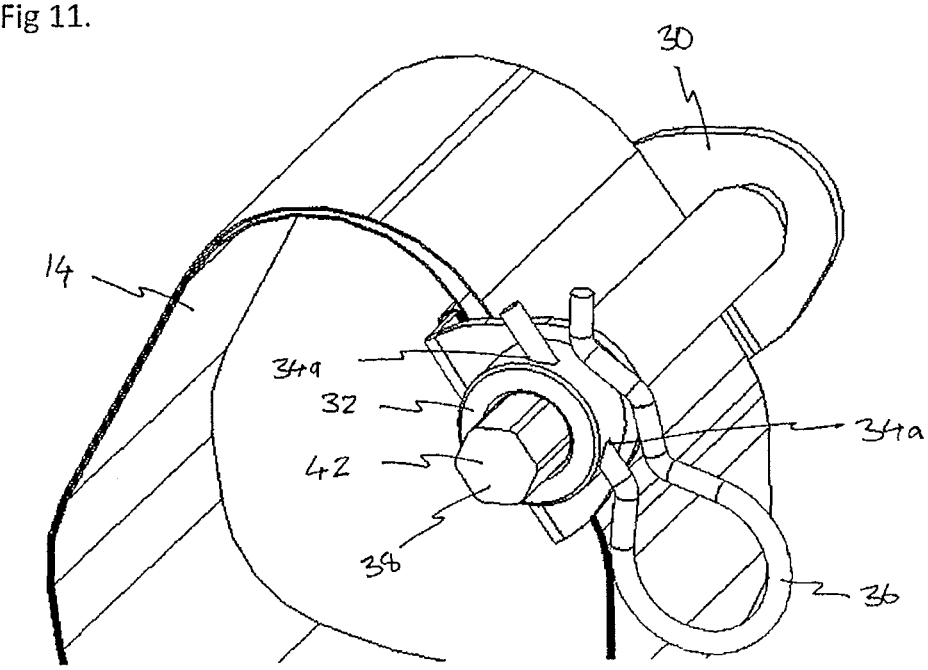
FIG. 11 is a perspective view of an alternative winding and locking mechanism of the present invention.
Figure 12:
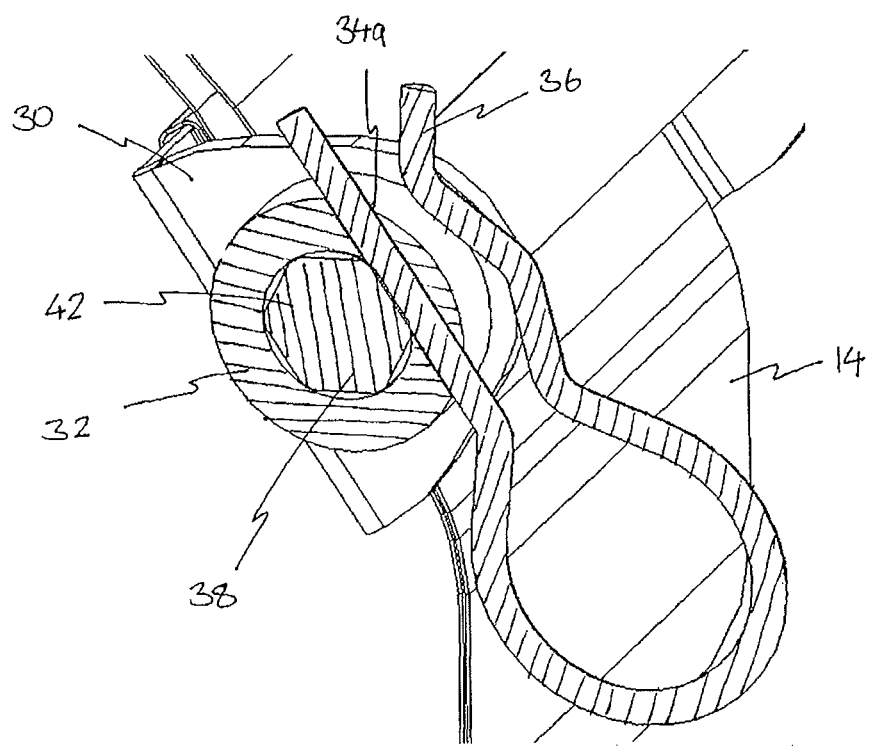
FIG. 12 is a sectional view of the locking mechanism of FIG. 11.

In a further alternative, a different locking mechanism is provided, as shown in FIGS. 11 and 12. In this example the hexagonal head 42 of axle 38 extends into collar 32. The multiple apertures 34 have been replaced by a single aperture 34a. The aperture is aligned so that when clip pin 36 extends through aperture 34a a flat portion of the pin engages a flat surface of hexagonal head 42 where it extends into the collar 32.

The invention claimed is:

1. A cable retaining apparatus for retaining at least one cable, the apparatus comprising (a) a band adapted to be wrapped around at least one cable and having a first end and a second end, the first end being remote from the second end, and (b) a clamping device for holding said first end of said band relative to said second end of said band, said clamping device comprising:—
   a body portion non-removably fixedly mounted to said first end of said band, said body portion having at least one axle mounting device; and
   an axle rotatably mounted to at least one said axle mounting device of said body portion, said axle having
      at least one band end engaging device for removably connecting said axle to said second end of said band after said band is wrapped around said at least one cable, said band extending from said first end fixed to said clamping device to said second end engaged by said axle so that said band and clamping device form a loop that is reduced in circumference by turning the axle, and
      at least one axle rotation device for allowing the axle to be rotated relative to said body portion,
   wherein at least one said axle mounting device comprises a plurality of first apertures extending therethrough along first axes that extend through the axle at different angular locations relative to the axle that receive a retaining pin extending through the axle at any of said angular locations, wherein said first axes are arranged at least one first angle relative to each other, and said axle further comprises a plurality of second apertures adapted to be selectively aligned with one of said first apertures such that when said retaining pin extends through said one of said first apertures and a said second aperture said axle is prevented from rotating relative to at least one said axle mounting device, and wherein each said second aperture has a respective second axis extending therethrough such that neighboring said second axes are spaced apart angularly and arranged at at least one second angle relative to each other, said at least one first angle being different from said at least one second angle such that any second axis is aligned with any first axis to insert said pin along said aligned first and second axes to lock the axle relative to the first end of the band affixed to the body portion, but not lock the axle to the second end of the band which remains secured to the axle only by said removable connection.

2. An apparatus according to claim 1, wherein said body portion comprises at least one base portion attached to said band and side portions extending from said base portion.

3. An apparatus according to claim 2, wherein at least one said axle mounting device comprises an axle mounting aperture in each of said side portions and a collar mounted to at least one of said side portions, and said first apertures extend through said collar.

4. An apparatus according to claim 1, wherein at least one said band engaging device comprises a third aperture extending at least partially through said axle.

5. An apparatus according to claim 4, wherein said third aperture comprises a slot adapted to receive said second end of said band, wherein rotation of said axle causes said band to become fixedly attached to said axle.

6. An apparatus according to claim 1, wherein at least one said rotation device comprises at least one tool engaging device for engaging a tool adapted to apply a rotational force to said axle.

7. An apparatus according to claim 1, further comprising at least one cable around which said band of said apparatus is wrapped.

* * * * *